Aug. 23, 1927.

L. O. BEARD 1,639,835

VALVE SEAT REFACING TOOL

Filed Oct. 9, 1926

Inventor
Lawrence O. Beard
By Percy H. Moore
Atty.

Patented Aug. 23, 1927.

1,639,835

UNITED STATES PATENT OFFICE.

LAWRENCE O. BEARD, OF LANCASTER, PENNSYLVANIA.

VALVE-SEAT-REFACING TOOL.

Application filed October 9, 1926. Serial No. 140,614.

My invention relates to improvements in refacing tools, and is more particularly directed to that type of tool adapted to reface worn or imperfect valve seats of an internal combustion engine.

The principal object of my invention is to provide a tool of the class described which is economical to manufacture and which can be readily and effectively used by the average non-skilled mechanic or car owner.

Another object of my invention is to provide a tool of the class described in which the cutter head is adapted to accommodate cutter blades of different lengths.

A still further object of my invention is to provide novel means for clamping the cutter blades in the cutter head.

Other and more specific objects and advantages of my invention will be apparent as the specification is considered in connection with the accompanying drawing, in which.

Figure 1:
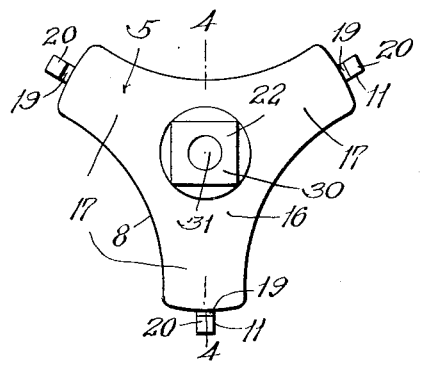
Figure 1 is a top plan view of the tool.
Figure 2:
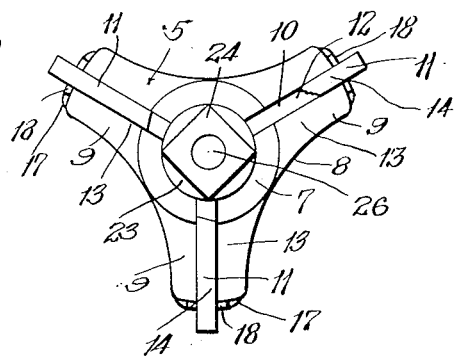
Figure 2 is a bottom plan view thereof.
Figure 3:
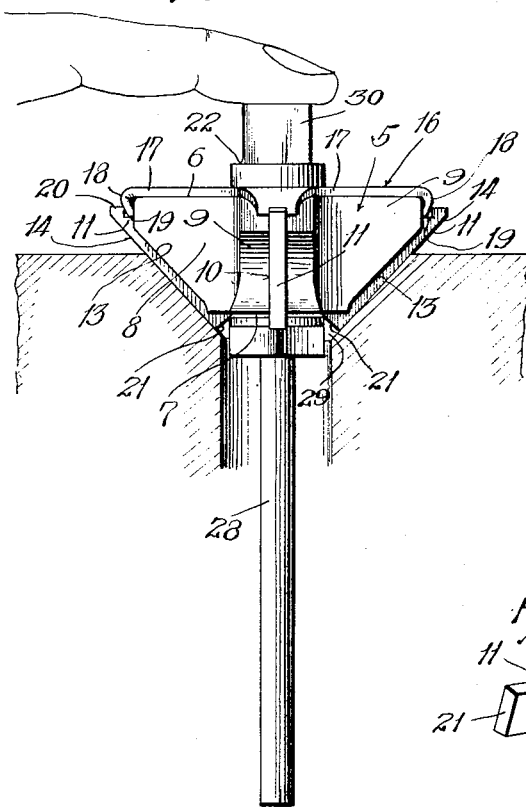
Figure 3 is a side elevation showing the manner of using the tool.
Figure 4:
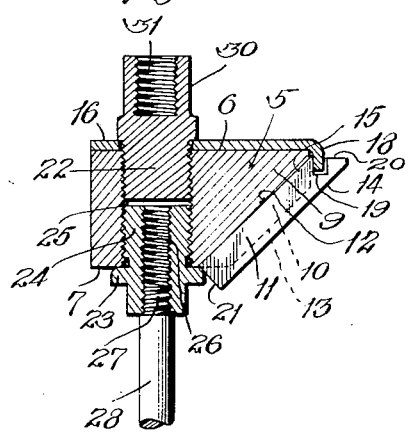
Figure 4 is a section on the line 4—4 of Figure 1.
Figure 5:
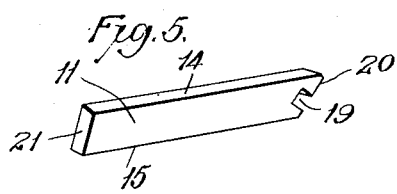
Figure 5 is a side view of one of the cutter blades detached.

Referring more specifically to the drawing, wherein like reference numerals refer to corresponding parts throughout the several views, 5 denotes a cutter head of substantially inverted cone shape and having the flat upper and lower faces 6 and 7 respectively. The cutter head is cut away as at 8 to reduce weight and the three projections or arms 9 thus produced are formed with the open ended slots 10 adapted to adjustably receive therein the cutter blades 11. These slots are of uniform depth, and the bottom walls 12 thereof parallel the flat angular faces 13 of the three projections or arms 9. The faces 13, as disclosed in the drawings, are at an angle of approximately forty-five degrees to the aforesaid upper and lower faces 6 and 7. Furthermore, in instances where angle of the valve seat is less or greater than forty-five degrees, the faces 13 are formed on an angle to properly engage the seats. As the outer and inner edges 14 and 15 of the blades are parallel and the depth and length of the blades are approximately that of the slots, it would be a simple matter to adjust the blades in position but for the fact that the blades, due to defects in manufacture, frequently vary in length. This defect is compensated for in a manner about to be described.

After the cutter blades have been inserted in the slots 10, the former are flexibly clamped in place by means of a spider-like plate 16 of flexible material and of substantially the same configuration as that of the upper face 6 of the cutter head. The three arms 17 of the plate 16 are superposed upon the projections 9 of the cutter head, and are formed with downwardly bent flanges 18 which engage in the notches or slots 19 formed in the beveled upper end 20 of the cutter blades 11 and flexibly hold the latter against displacement, the plate 16 being clamped to the cutter head by means of a shouldered nut screwing into the upper end of a threaded bore 25 in the cutter head. The lower end faces of the cutter blades are squared as at 21 for engagement by the head 23 of a threaded sleeve 24 which screws into the lower end of the bore 25, previously mentioned, thus clamping the cutter blades between the nut and the plate 16. It will be noted that the action of the nut 24 as the latter is screwed home is to force the cutter blades upwardly longitudinally of the slots 10 against the flanges 18. As the arms 16 are capable of being slightly flexed, any slight difference in the lengths of the cutter blades will be compensated.

The sleeve 24 is formed with a threaded bore 26 to receive the threaded seat 27 of a pilot stem 28 for guiding the tool into the valve seat 29, and the upper end of the nut 22 is squared as at 30 and is also formed with a socket 31 to facilitate application thereto of the connections of a standard wrench for operating the tool (not shown). The preferred manner of operating the tool, however, is to bear down on the nut 30 with the finger or thumb of the left hand and at the same time turn the cutter head with the right hand by means of a small hand wrench (not shown).

In the drawings and the hereinabove description I have shown the cutter as being provided with three blades. It is of course understood that the number of blades may be increased or decreased as desired.

Having thus described my invention, what I claim is:

1. A valve seat refacing tool comprising a centrally bored cutter head having grooves therein, blades adapted to seat in said grooves, a plate on said cutter head, and members screwing into opposite ends of the bore in said cutter head for slidably adjusting said blades in said grooves upwardly and downwardly and locking said blades between one of said members and said plate, said plate adapted to flexibly resist the outward movement of said blades in said slots.

2. A valve seat refacing tool comprising a cutter head having grooves therein, blades adapted to seat in said grooves, a flexible plate on said cutter head, means bearing against the inner edges of said plate for clamping it to the cutter head, the outer edges of the plate being free, and means for forcing said blades longitudinally of said grooves against the free edges of said plate.

3. A valve seat refacing tool comprising a cutter head having substantially flat upper and lower faces, said cutter head formed with angular grooves extending between said faces, blades adapted to seat in said grooves, a flexible plate on the upper face of said cutter head adapted to engage with its outer edges only one end of the cutter blades, means on the lower face of said cutter head adapted to engage the other end of said blades for holding the blades in the grooves in cooperation with said flexible plate, and means engaging the inner edges only of the flexible plate for holding the same to the cutter head.

4. A valve seat refacing tool comprising a cutter head having grooves therein, notched cutter blades adapted to seat in said grooves, a flexible plate having projections on its free outer edges for engaging in said notches, and means for forcing said blades upwardly into engagement with said projections, and means for positively clamping the inner edges of said plate to the cutter head, said means leaving the outer edges of said plate free.

In testimony whereof I affix my signature.

LAWRENCE O. BEARD.